United States Patent
Perego

(10) Patent No.: US 11,524,312 B2
(45) Date of Patent: Dec. 13, 2022

(54) APPARATUS FOR SURFACE TREATMENT OF ARTICLES, AND TREATMENT PROCESS FEASIBLE BY SAID APPARATUS

(71) Applicant: TAPEMATIC S.P.A., Ornago (IT)

(72) Inventor: Luciano Perego, Ornago (IT)

(73) Assignee: TAPEMATIC S.P.A., Omago (IT)

( * ) Notice: Subject to any disclaimer, the term of this patent is extended or adjusted under 35 U.S.C. 154(b) by 685 days.

(21) Appl. No.: 16/523,338

(22) Filed: Jul. 26, 2019

(65) Prior Publication Data

US 2020/0030838 A1      Jan. 30, 2020

(30) Foreign Application Priority Data

Jul. 26, 2018    (IT) .................. 102018000007519

(51) Int. Cl.
  *B65G 49/04*       (2006.01)
  *B05B 16/20*       (2018.01)
  *B05B 13/02*       (2006.01)
  *B08B 3/02*        (2006.01)

(52) U.S. Cl.
  CPC .......... *B05B 16/20* (2018.02); *B05B 13/0221* (2013.01); *B65G 49/0459* (2013.01); *B08B 3/022* (2013.01)

(58) Field of Classification Search
  None
  See application file for complete search history.

(56) References Cited

U.S. PATENT DOCUMENTS

| | | | | |
|---|---|---|---|---|
| 4,353,325 | A | * | 10/1982 | Argazzi .................... B05C 9/08 118/683 |
| 9,297,064 | B2 | * | 3/2016 | Parent ................. B29C 45/0084 |
| 2010/0266780 | A1 | | 10/2010 | Lawrynowicz et al. |
| 2013/0161183 | A1 | * | 6/2013 | Leahey ............. H01J 37/32889 204/298.25 |
| 2015/0273493 | A1 | * | 10/2015 | Xue .................... B05B 13/0228 239/224 |
| 2017/0216869 | A1 | * | 8/2017 | Colombaroli ....... B05B 13/0442 |
| 2019/0283193 | A1 | * | 9/2019 | Heppe ................. B23Q 39/042 |

FOREIGN PATENT DOCUMENTS

WO       2017/029644 A1      2/2017

OTHER PUBLICATIONS

Extended European Search Report for Application EP 19182249.3 dated Dec. 10, 2019 (5 pages).

\* cited by examiner

*Primary Examiner* — Charles Capozzi
(74) *Attorney, Agent, or Firm* — J. Miguel Hernandez; James R. Gourley; Carstens, Allen & Gourley, LLP

(57) ABSTRACT

An apparatus for surface treatment of articles comprises a plurality of trays (4) each carrying one or more piece-holding spindles (3). A primary transport assembly (19) removably engages the trays (4) to transfer them according to a step-by-step motion between a plurality of stopping locations (A . . . J) distributed along the movement path (P), along which respective work stations (12, 13, 14, 15) operate. At least one additional transport assembly (31*a*, 31*b*) withdraws each tray (4) from the primary transport assembly (19) at one of said stopping locations (A . . . J), for moving it at one of said work stations (12, 13, 14, 15), and engaging it again with the primary transport assembly (19).

14 Claims, 6 Drawing Sheets

APPARATUS FOR SURFACE TREATMENT OF ARTICLES, AND TREATMENT PROCESS FEASIBLE BY SAID APPARATUS

CROSS-REFERENCE TO RELATED APPLICATIONS

This application claims the benefit under 35 U.S.C. 119(a) and 37 CFR § 1.55 to Italian patent application 102018000007519 filed Jul. 26, 2018, the entire content of which is incorporated herein by reference.

CROSS-REFERENCE TO RELATED APPLICATIONS

This application claims the benefit under 35 U.S.C. § 119(a) and 37 CFR § 1.55 to Italian patent application 102018000007519 filed Jul. 26, 2018, the entire content of which is incorporated herein by reference.

FIELD OF THE INVENTION

The present invention relates to an apparatus for the surface treatment of articles. The invention also relates to a process for surface treatment of articles, which can conveniently be carried out by means of the aforementioned apparatus. In particular, in a preferential embodiment the invention can conveniently be used for the execution of a surface finishing process by painting.

Currently, the use of containers, bottles, closure elements, keys, knobs or other objects having a high degree of surface finishing is in great demand, for example in the pharmaceutical field, in cosmetics, in machine components industry etc.

BACKGROUND OF THE INVENTION

The degree of finishing required may require different surface treatments, depending on the type of finishing desired. For example, when a painting process is adopted it is normally required that each article being processed, generally of plastic material, is initially subjected to preparation by means of cleaning, possible activation by means of the corona effect, application of a primer and/or base coating, deposition of a pigmented layer, and deposition of a transparent protective finishing (top coating). The applications of the base layer, of the pigmented coating and of the protective finishing are each followed by a drying treatment, for example by infrared and/or UV irradiation.

U.S. Pat. No. 9,487,857, on behalf of the same Applicant, describes an article painting machine, each arranged on a piece-holding spindle. The piece-holding spindles are grouped together on respective trays that advance along a supply line. Adjacent to the supply line is a rotating platform provided with a plurality of seats distributed circumferentially around its own rotation axis. Transfer members lend themselves to withdrawing each piece-holding spindle from the respective tray arranged along a supply line, to place it in one of the seats and vice versa. Due to the rotation of the platform, the articles carried by the piece-holding spindles transit sequentially through various work stations, including a painting station at which actuation means are installed operating on the piece-holding spindle to determine the rotation of the article to be painted around the axis thereof.

The Applicant believes that the current equipment for surface treatment of articles can be improved in terms of operating flexibility and setting simplicity for the purposes of execution of different processing operations from time to time. In particular, it has been observed that at the current state of the art it is difficult to find the right compromise between the needs in process in the different work stations. In fact, adapting the execution of the work cycle in a specific work station affects the processing in all the other work stations.

Particular difficulties are also encountered in the correct execution of the painting or other surface finishing treatment of articles having an uneven conformation around their own rotation axis, for example with a rectangular, elliptical, or with a complex conformation base with one or more undercuts.

The Applicant has in fact observed that in order to meet the needs of the market, tending to a progressive increase in the quality standards of the final product, it is important that each operation executed along the movement path is carried out according to specific parameters. These parameters may vary from time to time depending on different factors that are not always easily predictable and/or controllable, such as for example the materials with which the articles being processed are made, their geometric and dimensional characteristics, the physical surface characteristics, the paints used, the environmental conditions in which the process takes place.

Furthermore, the process specifications required by each operation may be different from those required for another processing.

SUMMARY OF THE INVENTION

The main object of the present invention is to overcome the limitations of the state of the art, increasing the operational versatility in painting or other surface treatment of articles, and simplifying the setting for the purpose of an optimal execution of the processing. In particular, an apparatus is intended to be provided which makes it possible to easily modulate the translation and/or rotation speed of the articles in one or more of the work stations to adapt it, if necessary, also in real time, to the specific production needs.

In this regard the Applicant has observed that in the painting or similar treatments provided in the finishing cycle one of the critical parameters that significantly affect a good execution of the processing is represented by the movement speed of the articles within the same work station. In particular, for the purpose of execution of the painting it is convenient that the articles translate in front of the paint delivery nozzles at a speed and for a controlled time, which may be different each time depending on the type of processing. Also, the peripheral rotation speed of the articles during processing is a factor that can significantly affect the quality of final execution. Tendentially, articles of greater diametral clearance and/or complex shape require a rotation speed lower than that required by smaller diametral clearance articles. Articles with a particular geometric shape can make a passage in front of the painting nozzles convenient in presence of rotation, and a possible second passage in absence of rotation and/or with a different rotation speed and/or with a reversed rotation direction. The same concept applies to each of the operations to which the articles are subjected during the treatment process, and it may be convenient that the movement parameters in a work station are different from those adopted in other work stations.

According to a first aspect, the invention relates to an apparatus for the surface treatment of articles, comprising: a plurality of trays each carrying one or more piece-holding spindles; a plurality of work stations distributed along a movement path extending along a closed line, wherein said plurality of work stations comprises at least one first work station and at least one second work station each configured for the execution of a respective treatment on articles arranged on the piece-holding spindles; a transport guide slidably engaging said trays and extending along the movement path; movement devices for translating the trays along the transport guide, through the work stations; wherein said movement devices comprise a programmable electronic control unit, configured to modulate the translation speed of the individual trays along the transport guide, so that during the execution of the treatment in the first work station each tray translates at a different speed with respect to a translation speed of the trays in the second work station.

According to a further aspect, the invention relates to a process for the surface treatment of articles, comprising the actions of: arranging on respective trays a plurality of articles carried on respective piece-holding spindles, said trays being slidably engaged along a transport guide extending along a closed line along a movement path; translating the trays along the transport guide to subject the articles carried by each tray to a plurality of treatments at respective work stations distributed along the movement path, wherein said work stations comprise at least one first work station and at least one second work station; further comprising the action of modulating the translation speed of the individual trays along the transport guide so that, during the execution of the treatment in the first work station, each tray translates at a different speed with respect to a translation speed of the trays in the second work station.

The movement carried out in the first work station(s) is therefore independent of that operated in the second work station(s) and/or along the remaining parts of the movement path and, therefore, lends itself to being freely modulated and managed depending on the processing requirements in the respective work station, without affecting the movement of the trays in other areas along the movement path. The possibility to manage the movement of the trays independently in the different work stations allows to increase the operating flexibility of the apparatus and the quality of the processing. In particular, for example during a painting treatment, it is possible to adjust the translation speed of the trays to adapt it from time to time to the processing needs, and/or to move the tray according to forward and backward strokes to promote a homogeneous distribution of the paint also during the processing of articles having complex conformation and/or provided with undercuts that are difficult to reach by the paint.

In at least one of the above aspects, the invention can also conveniently comprise one or more of the following preferential characteristics.

Preferably, said movement devices are configured for translating the trays according to a continuous or alternate movement at the first work station, and according to a step-by-step motion at the second work station.

Preferably, said electronic control unit is configured to subject the tray to an alternate movement comprising at least a first forward stroke, a backward stroke, and a second forward stroke along the movement path.

Preferably, the alternate movement of the tray takes place while the articles carried by the tray itself are subjected to the treatment in the first work station.

Preferably, said at least one first work station comprises a painting station, comprising delivery nozzles which can be selectively activated to deliver atomized paint during the translation of the tray in the same painting station.

Preferably, the nozzles can be selectively activated to deliver atomized paint during at least one of said forward strokes and at least one of said backward strokes.

Preferably, said electronic control unit is configured to subject each tray to an alternate movement comprising at least a first forward stroke, a backward stroke, and a second forward stroke along the movement path, during the execution of the treatment in the first work station.

Preferably, said movement devices are configured for translating the trays according to a continuous or alternate movement at the first work station, and according to a step-by-step motion at the second work station.

Preferably, said at least one first work station comprises a painting station, comprising delivery nozzles which can be selectively activated to deliver atomized paint during the translation of the tray in the same painting station.

Preferably, the nozzles can be selectively activated to deliver atomized paint during at least one of said forward strokes and at least one of said backward strokes.

Preferably, said at least one first work station comprises a polymerization station, comprising UV emitters which can be selectively activated to deliver a UV radiation during the translation of the tray in the same polymerization station.

Preferably, the UV emitters can be selectively activated to deliver the UV radiation during at least one of said forward strokes and at least one of said backward strokes.

Preferably, the movement devices comprise a primary transport assembly configured to removably engage the trays and transfer them along the transport guide.

Preferably, the movement devices comprise at least one additional transport assembly configured to withdraw each tray from the primary transport assembly, move it at said first work station, and engage it again with the primary transport assembly.

Preferably, the primary transport assembly is configured to transfer the trays according to a step-by-step motion through a plurality of stopping locations distributed at the same distance along the movement path.

Preferably, the additional transport assembly is configured to withdraw each tray at one of said stopping locations.

Preferably, the additional transport assembly is configured to withdraw each tray from the primary transport assembly without disengaging it from the transport guide.

Preferably, the additional transport assembly extends parallel to the movement path between at least two consecutive stopping locations, to transfer the tray withdrawn from one to the other of the same consecutive stopping locations.

Preferably, the stopping locations are respectively at the same distance along the movement path.

Preferably, the additional transport assembly comprises a carriage slidably guided parallel to the movement path.

Preferably, the carriage is movable along a transport guide upon the action of a translation motor.

Preferably, the primary transport assembly comprises a plurality of translators distributed along a flexible dragging member extending along a closed line along the movement path.

Preferably, each tray carries hooking devices that can be selectively activated to engage the tray itself with the primary transport assembly.

Preferably, each translator is integral with the dragging member.

Preferably, the dragging member comprises a dragging belt.

Preferably, the hooking devices comprise a mobile drag pin between a first working position wherein it engages the primary transport assembly and a second working position wherein it disengages the primary transport assembly.

Preferably, the drag pin is configured to be inserted axially, in the first working position, in a gripping seat carried by each of said translators.

Preferably, the drag pin is configured to engage the carriage in the second working position.

Preferably, the drag pin is configured to be inserted axially, in the second working position, in a grafting seat carried by the carriage.

Preferably, a control actuator is provided which is carried by the carriage and removably engageable with the drag pin.

Preferably, the control actuator can be activated to translate the drag pin between the first working position and the second working position.

Preferably, the control actuator has a housing undercut configured to receive a perimetral shoulder of the drag pin, said perimetral shoulder being slidably insertable in the housing undercut along a sliding direction parallel to the movement path.

Preferably, at least one of the work stations operates at least at one of the stopping locations.

Preferably, each of said trays carries rotation actuation devices of the piece-holding spindles.

Preferably, said actuation devices comprise a transmission member actuated by a driving pulley coaxially integral with a drive member.

Preferably, the drive member can be removably engaged with at least one actuation assembly operating along the movement path.

Preferably, the actuation assembly comprises a drive shaft actuated in rotation and carrying a dragging plate which can be magnetically coupled with the drive member to drag the driving pulley of the tray into rotation.

Preferably, the movement devices further comprise an auxiliary actuation assembly operating at the first work station to actuate in rotation the piece-holding spindles.

Preferably, the auxiliary actuation assembly comprises an auxiliary rotation motor.

Preferably, said programmable control unit operates on the auxiliary rotation motor, and is configured to adjust the rotation speed and/or to reverse the direction of rotation of the piece-holding spindles.

Preferably, said programmable control unit operates on the auxiliary rotation motor, and is configured to reverse the direction of rotation of the piece-holding spindles.

Preferably, the auxiliary actuation assembly comprises an auxiliary dragging plate which can be operatively coupled with the drive member.

Preferably, the auxiliary dragging plate can be actuated by means of the auxiliary rotation motor carried by the carriage.

Preferably, the auxiliary dragging plate is coplanar with the dragging plates in the other stopping locations.

Preferably, the work stations comprise an infrared drying station.

Preferably, the UV ray polymerization station comprises one or more LED emitters.

Preferably, the work stations comprise a loading/unloading station of the articles onto/from the individual trays.

Preferably, the action of translating the trays at said at least one first work station takes place according to a continuous movement.

Preferably, the action of translating the trays at least at said one first work station takes place according to an alternate movement at the first work station.

Preferably, said alternate movement comprises at least one first forward stroke, a backward stroke, and a second forward stroke along the movement path, during the execution of the treatment in the first work station.

Preferably, the action of translating the trays at least at said one second work station takes place according to a step-by-step motion at least at said one second work station.

Preferably, the execution of the treatment in said at least one first work station coincides with at least one action of delivering atomized paint against the articles during the movement of the tray.

Preferably, the execution of the treatment in said at least one first work station coincides with at least one irradiating action of the articles by means of a UV radiation during the movement of the tray.

Preferably, the action of translating the trays comprises: removably engaging the trays to a primary transport assembly; by means of the primary transport assembly, transfer each tray along the movement path.

Preferably, the action of translating the trays further comprises the actions of: withdrawing each tray from the primary transport assembly by means of at least one additional transport assembly; by means of said additional transport assembly, moving the tray at the first work station, and engaging it again with the primary transport assembly.

Preferably, the transfer of the trays by means of the primary transport assembly takes place according to a step-by-step motion between a plurality of stopping locations distributed at the same distance along the movement path.

Preferably, the withdrawing of the trays takes place at one of said stopping locations.

Preferably, the additional transport assembly operates between at least two consecutive stopping locations.

Preferably, during the movement by the additional transport assembly the tray is transferred from one to the other of said consecutive stopping locations.

Preferably, said step-by-step motion comprises steps of simultaneous advancement of the trays engaged to the primary transport assembly, intercalated with steps of simultaneous stop of the same trays.

Preferably, the piece-holding spindles are actuated in rotation during the step of stopping the step-by-step motion.

Preferably, the movement by the additional transport assembly takes place during one of the steps of stopping the step-by-step motion.

Preferably, the stopping steps last at least 3 times the duration of the stopping steps.

Preferably, the piece-holding spindles are actuated in rotation during the translation of the tray at said at least one first work station.

Preferably, the actuation in rotation of the piece-holding spindles during the translation of the tray at said at least one first work station takes place independently from the rotation of the piece-holding spindles during the translation of the tray at the second work station.

Preferably, the action of modulating and/or reversing the rotation speed of the articles during the execution of the treatment at the said at least one first work station is also provided.

Further features and advantages will become more apparent from the detailed description of a preferred, but not exclusive, embodiment of an apparatus for the surface treatment of articles, and of a treatment process feasible by means of such apparatus, according to the present invention.

BRIEF DESCRIPTION OF THE DRAWINGS

Such description will be set forth hereinafter with reference to the accompanying drawings given only for illustrative and, therefore, non-limiting purpose, wherein.

DETAILED DESCRIPTION

Figure 1:
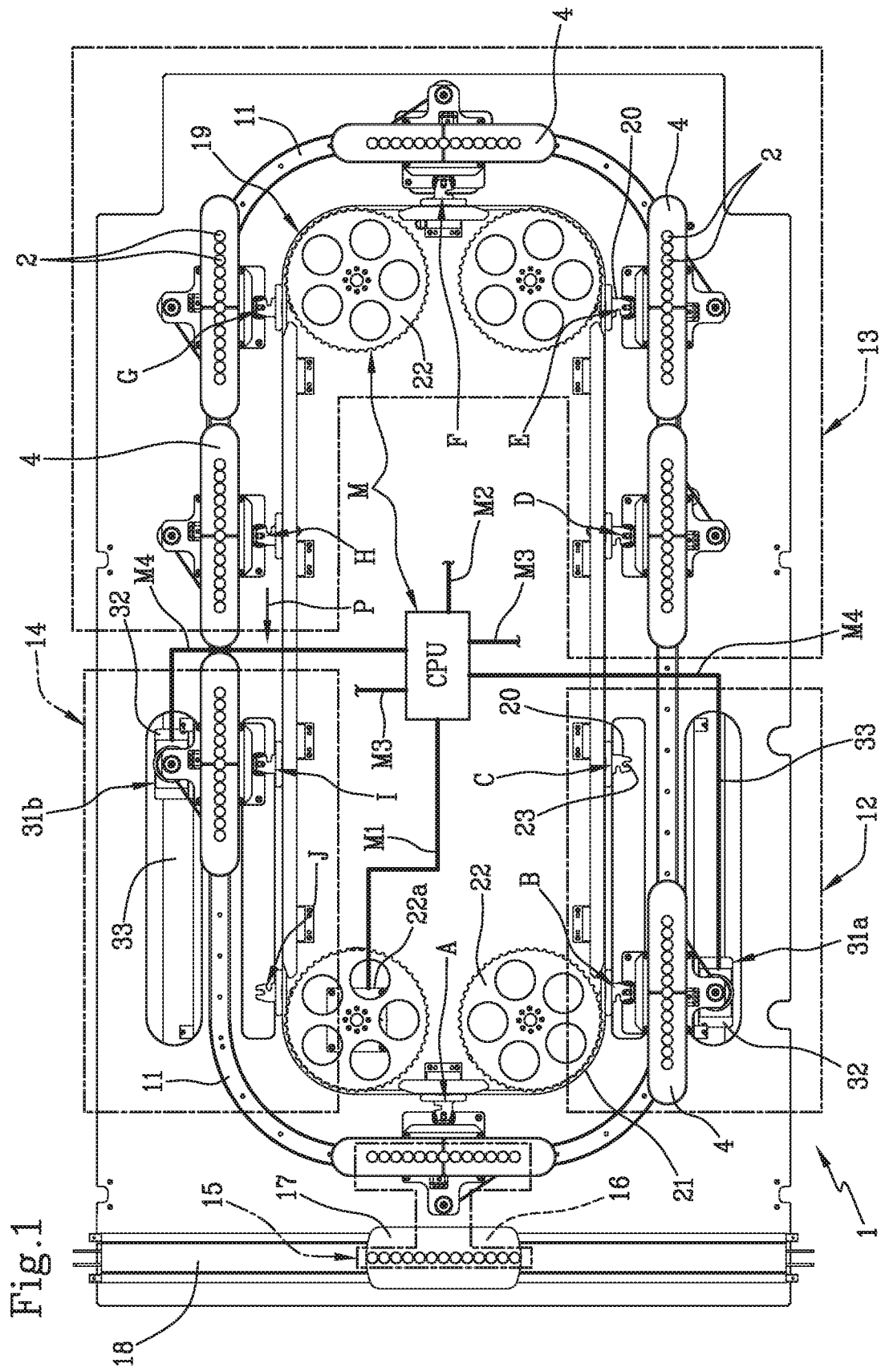
FIG. 1 schematically represents a plan view of an apparatus according to the present invention.

With reference to the mentioned figures, the number 1 generally indicates an apparatus for the surface treatment of articles, according to the present invention.

In the illustrated embodiment, the apparatus 1 is arranged for the execution of a painting treatment of a plurality of articles 2, each one arranged on a respective piece-holding spindle 3.

The piece-holding spindles 3 are carried by respective trays 4. Each tray 4 carries a group of piece-holding spindles 3, in the example illustrated thirteen piece-holding spindles 3, respectively aligned along a rectilinear direction and rotatably engaged each with a base plate 5 of the tray 4.

Figure 2:
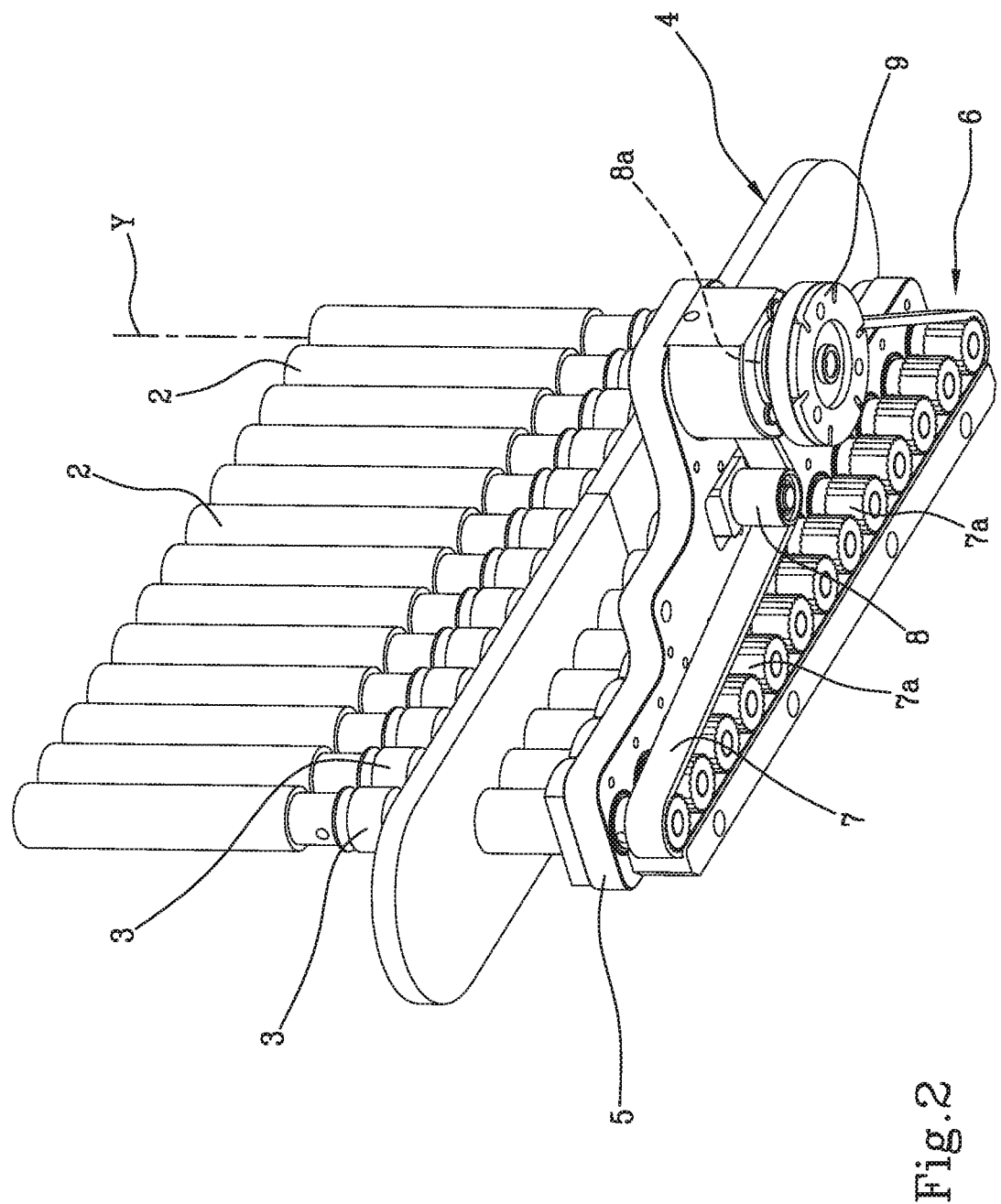
FIG. 2 represents an interrupted perspective view of a detail of the apparatus, showing rotational actuation devices associated with each of the trays.

Each tray 4 is conveniently equipped with rotational actuation devices 6 for the piece-holding spindles 3. Preferably, as can be better seen in FIG. 2, these rotational actuation devices 6 comprise a belt, preferably toothed, or another transmission member 7 extending around respective pulleys 8 carried by the base plate 5. One of the pulleys 8, visible in dashed line and identified by the reference 8a, is driving and coaxially integral with a drive member 9, comprising for example a draggable plate magnetically in rotation. The transmission member 7 operatively engages a plurality of toothed pinions 7a, each coaxially integral with one of the piece-holding spindles 3. By controlling the driving pulley 8a in rotation it is consequently possible to simultaneously actuate in rotation the piece-holding spindles 3 and the articles 2 carried by them, each around its own geometric axis Y.

The base plate 5 of each tray 4 carries, preferably on a lower side thereof, a plurality of rollers 10 by which each tray 4 is slidably engaged along a transport guide 11 extending according to a closed line along a movement path P. In turn, the movement path P preferably extends according to a closed-loop linear development, for example with substantially rectangular development.

A plurality of work stations 12, 13, 14, 15 is distributed along the movement path P, each one arranged for the execution of a respective processing provided in a cycle of treatment of the articles 2.

In the illustrated example, a painting station 12, an infrared drying station 13, an UV rays polymerization station 14 and a loading/unloading station 15 of the articles 2 on/from the individual trays 4 are provided. For the purposes of the present description, the painting station 12 and the polymerization station 14 are identified as first work stations, while the drying station 13 and the loading/unloading station are identified as second work stations.

The work stations 12, 13, 14, 15 are only schematically indicated since their constructive and functional details, unless otherwise indicated, are achievable in any convenient way according to the needs.

In the painting station 12 the articles 2 being processed are sprayed with paint delivered by one or more nozzles suitably positioned inside a painting booth and which can be selectively activated to deliver atomized paint. In the drying station 13 the articles 2 are exposed to an infrared radiation emitted by lamps suitably positioned inside a drying tunnel. In the polymerization station 14, the articles 2 are exposed to a UV radiation emitted by one or more lamps, LED emitters or emitters of another type, which can be selectively activated inside a polymerization cabin.

In the loading/unloading station 15, a manipulator 16 withdraws articles 2 previously treated in the polymerization station 14 from the respective tray 4 to replace them with new articles 2 to be subjected to the treatment cycle. The articles 2 to be treated can be withdrawn from a respective auxiliary tray 17 arriving along a first section of a supply line 18. The same auxiliary tray 17 also lends itself to receiving the articles 2 treated to remove them from the treatment apparatus 1, for example along a second section of the same supply line 18. The manipulator 16 can for example comprise a double gripping assembly which simultaneously withdraws articles 2 already treated or to be treated by the respective trays 4 and, after 180° rotation around a vertical axis, engages them again on the same trays in reversed positions.

Along the movement path P movement devices M operate, preferably comprising a primary transport assembly 19 which translates the trays 4 along the transport guide 11, through the work stations 12, 13, 14, 15.

To this end, the primary transport assembly 19 preferably comprises a plurality of translators 20 distributed along a toothed belt or other flexible dragging member 21, extending according to a closed line along the movement path P. In the illustrated example, the dragging belt 21 extends around four toothed wheels 22, which can be actuated in rotation by at least one drive motor 22a (FIG. 1) operating on one of the same.

Each translator 20 can for example comprise an insert made of rigid material integral with the dragging member 21 and carrying a gripping seat 23 operatively engageable by means of hooking devices 24 carried by each of the trays 4.

Figure 3:
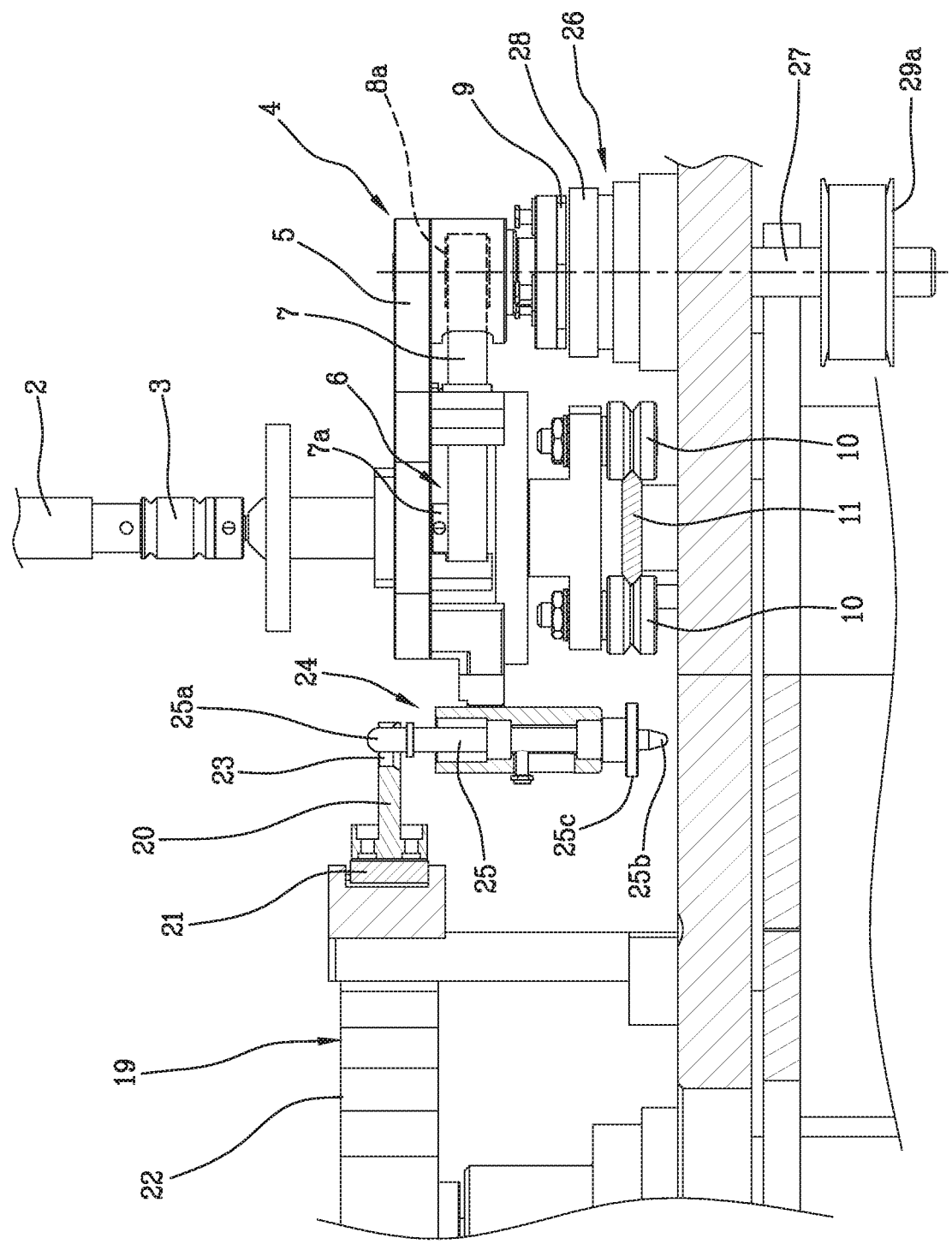
FIG. 3 is an interrupted section showing hooking devices of the tray in engagement relationship with the primary transport assembly.
Figure 4:
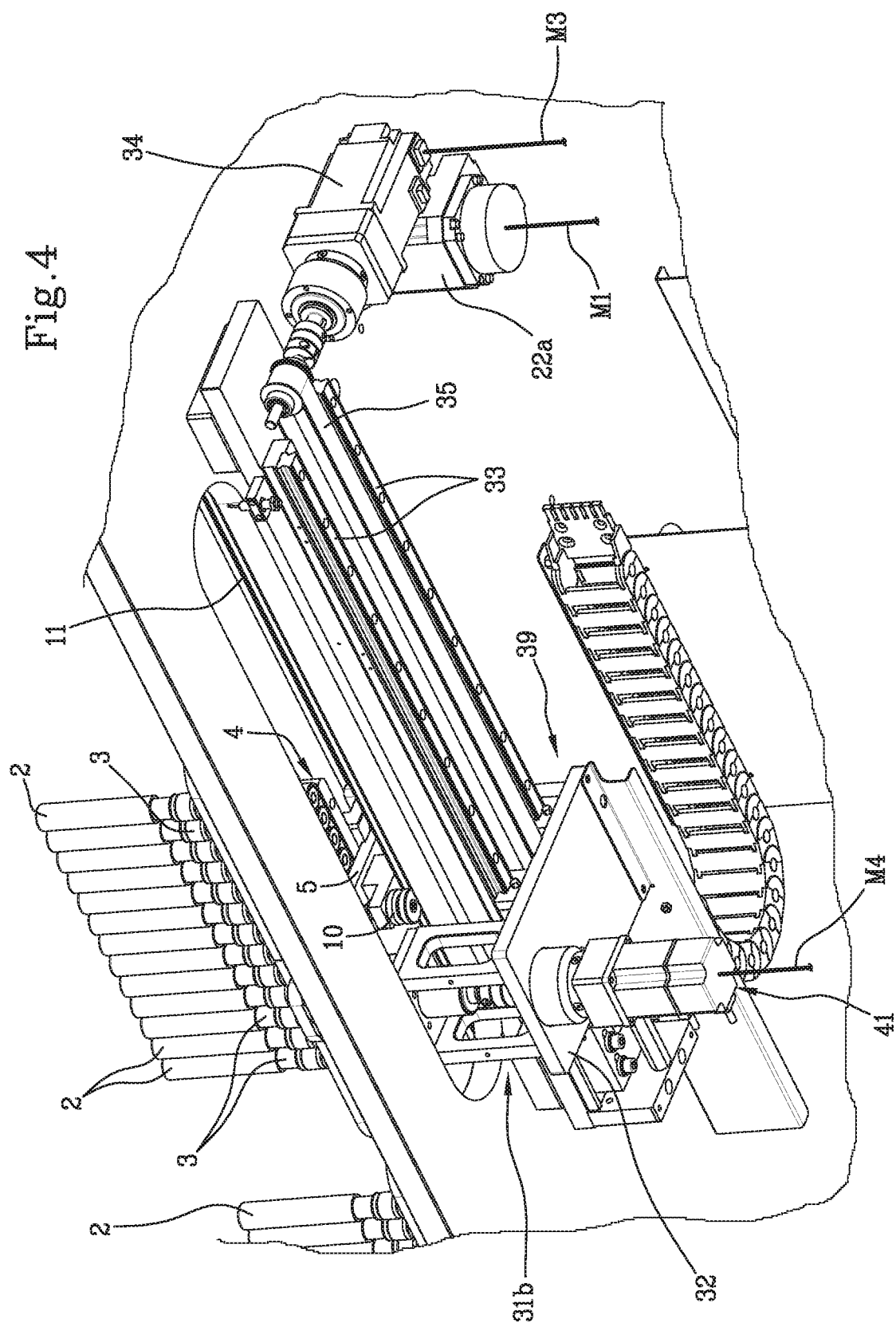
FIG. 4 represents an interrupted perspective view of a detail of the apparatus showing an additional transport assembly.
Figure 5:
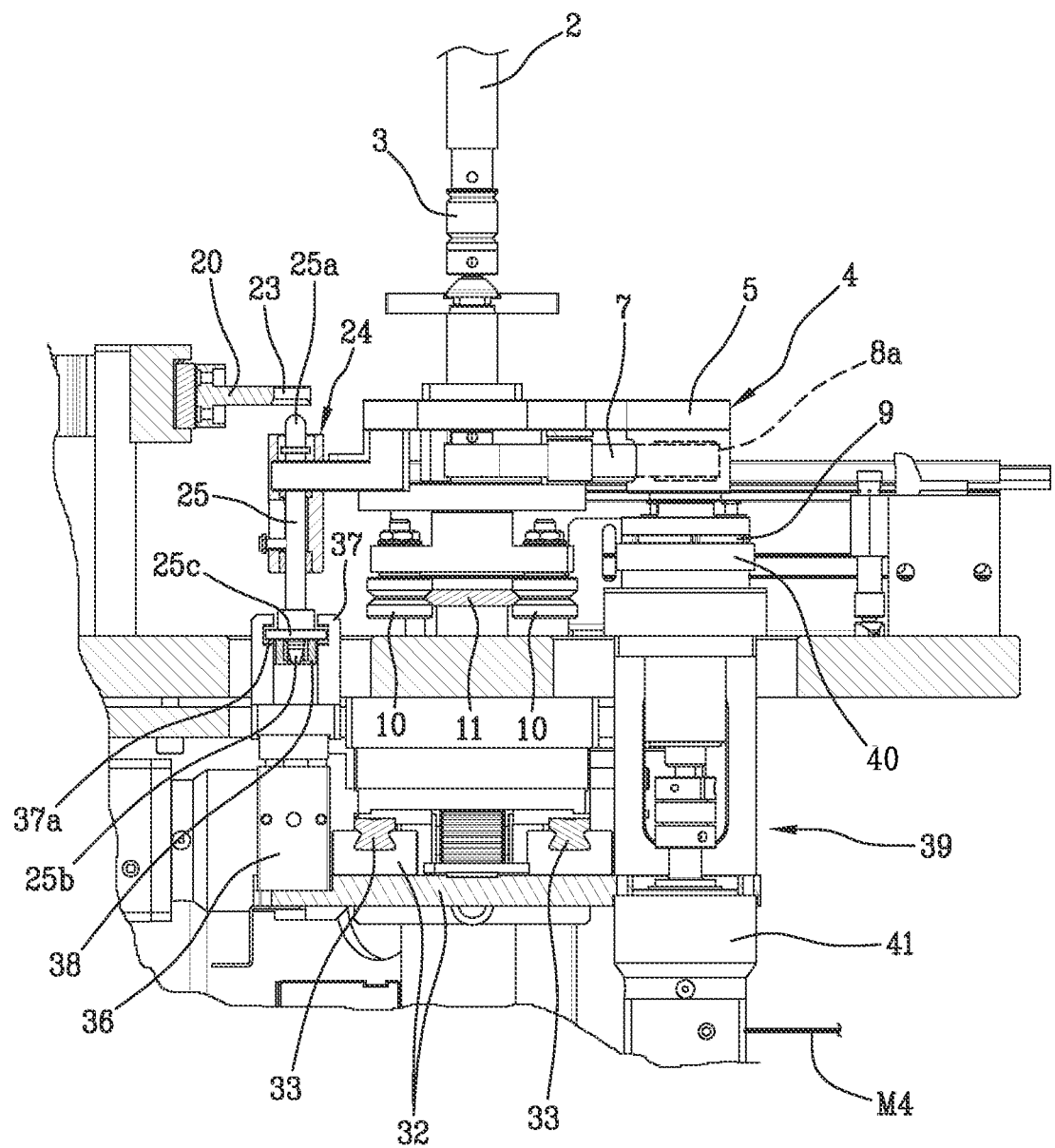
FIG. 5 is an interrupted section showing the hooking devices of the tray in engagement relationship with the additional transport assembly.

The hooking devices 24 can be selectively activated to removably engage the tray 4 with the primary transport assembly 19. To this end, the hooking devices 24 of each tray 4 preferably comprise a drag pin 25, slidably guided with respect to the base plate 5 and movable between a first working position and a second working position. In the first working position (FIG. 3), the drag pin 25 is inserted axially by means of a first end 25a thereof in the gripping seat 23 of one of the translators 20, so as to engage the tray 4 to the primary transport assembly 19. In the second working position the drag pin 25 is disengaged from the gripping seat 23 and, therefore, disengaged from the primary transport assembly 19.

A spring or other elastic element, not illustrated, can be provided to keep the drag pin 25 normally in the first working position.

The primary transport assembly 19 therefore lends itself to being removably engaged by the trays 4 and to transfer them between a plurality of distributed A . . . J stopping locations, preferably at the same distance, along the movement path P. In the example illustrated, ten stopping locations are provided, respectively marked with the letters A . . . J.

The movement devices M comprise a programmable electronic control unit CPU which can be operatively connected to the primary transport assembly 19, for example by means of a first connection line M1 leading to the drive motor 22a, and configured to manage the transfer of the trays 4 along the movement path P, preferably according to a step-by-step motion. This step-by-step motion comprises steps of simultaneous advancement of the trays 4 engaged with the primary transport assembly 19, intercalated with simultaneous stopping steps of the same trays, each at one of the stopping locations A . . . J. The frequency of step-by-step motion can be for example in the order of 10 cycles per minute, each comprising one of said advancement steps followed by one of said stopping steps. It is preferably provided that the stopping steps last significantly longer, indicatively equal to at least 3 times, with respect to that of the stopping steps. For example, for each movement cycle, the advancement step can last about 1 second, while the stopping step can last about 5 seconds.

One or more of the work stations 12, 13, 14, 15 operate at least at one of the stopping locations A . . . J, so that the articles 2 being processed are subjected to the respective processing provided in the treatment cycle during the stationing in the stopping locations A . . . J. For example, the loading/unloading station 15 can operate in a first stopping location A. The drying station 13 operates at five stopping locations D, E, F, G, H, respectively from the fourth to the eighth, consecutively arranged one after the other along the movement path P.

Figure 6:
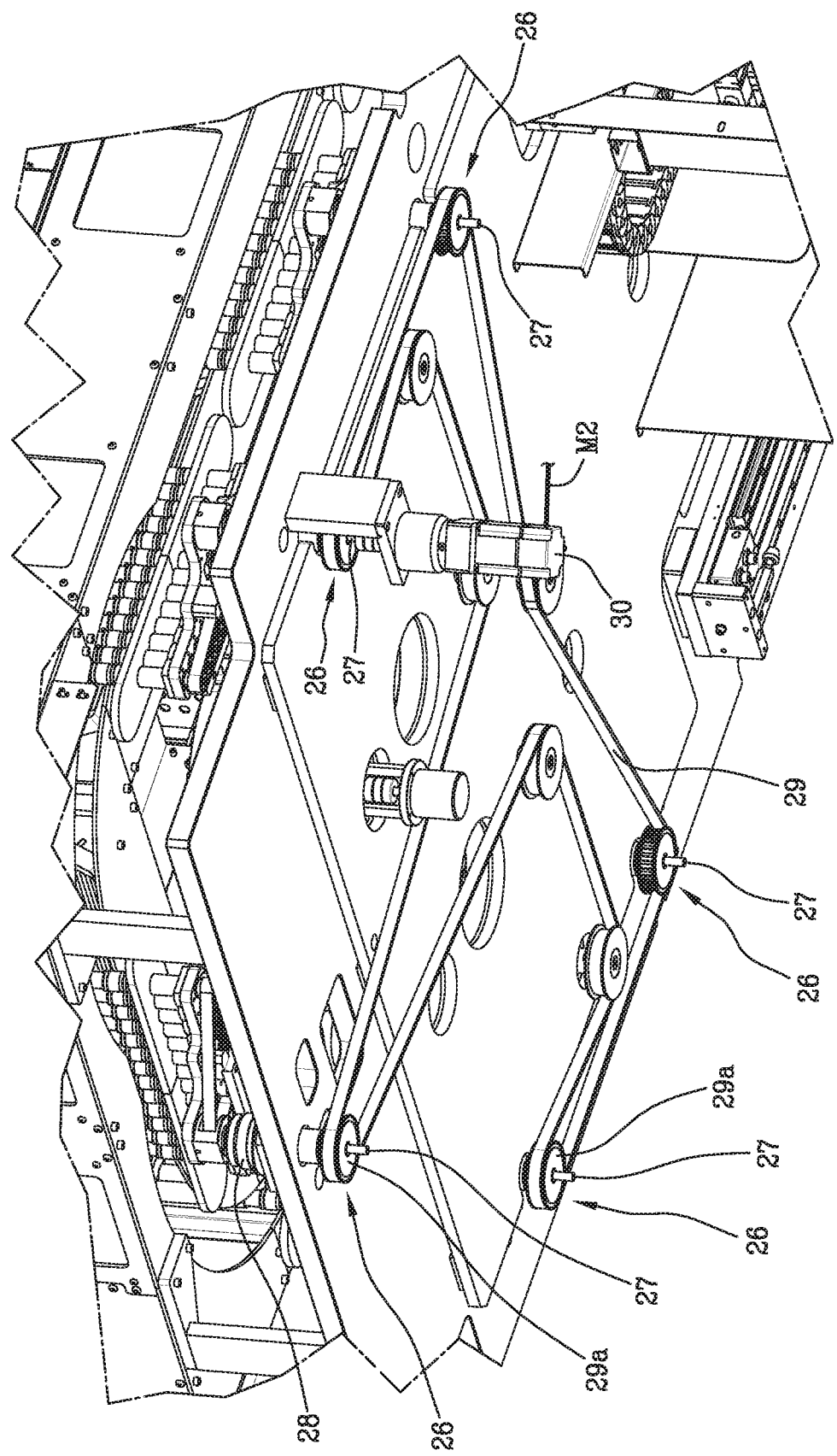
FIG. 6 represents an interrupted perspective view of a detail of the apparatus showing some assemblies for the actuation in rotation of the articles.

One or more of the stopping locations A . . . J can be equipped each with a respective actuation assembly 26 which can be operatively coupled with the drive member 9 carried by each of the trays 4, as each of the trays 4 arrives at the same stopping location. In the illustrated example, this actuation assembly 26 is associated with each of the stopping locations D, E, F, G, H from the fourth to the octave, at which the drying station 13 operates. Each actuation assembly 26 can for example comprise a drive shaft 27 actuated in rotation and carrying a dragging plate 28, which can be magnetically coupled with the drive member 9 carried by the respective tray 4 to drag the driving pulley 8 of the tray 4 itself into rotation. As best seen in FIG. 6, the drive shafts 27 can be mutually interconnected by means of a control belt 29 wound on respective pulleys 29a, for actuation in rotation by at least one rotation motor 30 operating on one of them. When the tray 4 arrives close to one of the stopping locations D, E, F, G, H equipped with the actuation assembly 26, the plate constituting the drive member 9 is facing at close distance to the dragging plate 28. At least one of the plates 26, 28 is provided with magnets. Consequently, the rotation of the dragging plate 28 cause the drive member 9 of the rotational actuation devices 6 of the tray 4 to rotate, determining the simultaneous rotation of the articles 2 around the respective axes during the stopping steps of the step-by-step motion. The absence of physical contact between the drive member 9 and the dragging plate 28 facilitates the mutual engagement and disengagement without causing impediments or delays in the step-by-step motion of the trays 4 along the movement path P.

Through a second connection line M2, the actuation of the rotation motor 30 can be managed by means of the programmable electronic control unit CPU, which can thus check and adjust the rotation speed of the articles 2 during the treatment of the drying station 13.

Preferably, the movement devices M further comprise at least one additional transport assembly 31a, 31b, operating at least at one of the first work stations 12, 14.

In the illustrated example, a first and a second additional transport assembly 31a, 31b are provided, respectively interlocked to the painting station 12 and to the polymerization station 14.

Each additional transport assembly 31a, 31b comprises a carriage 32 slidably guided parallel to the movement path P, preferably along a linear guide 33 fixed with respect to the movement path P. The movement of the carriage 32 along the linear guide 33 can be implemented by means of a translation motor 24 operating for example on a dragging belt 35 along which the carriage 32 itself is fixed.

The programmable electronic control unit CPU can be connected to the translation motor 32 by means of a third connection line M3, and configured to modulate the translation speed of the individual trays 4, so that during the execution of the treatment in the painting station 12 and/or in the polymerization station 14, each tray 4 translates at a different speed with respect to a translation speed of the trays 4 in the drying station 13 and/or in the loading/unloading station 15.

Each tray 4 which arrives in the first work station 12, 14 equipped with an additional transport assembly 31a, 31b, therefore lends itself to being conveniently moved in the same work station according to a different and independent movement with respect to the step-by-step motion caused by the primary transport assembly 19.

Each additional transport assembly 31a, 31b is preferably configured to withdraw the tray 4 from the primary transport assembly 19, conveniently at one of said stopping locations A . . . J, move it at the respective work station, and re-engage it to the primary transport assembly 19. Preferably, each additional transport assembly 31a, 31b extends parallel to the movement path P between at least two of the stopping locations A . . . J respectively consecutive, to transfer the tray 4 withdrawn from one to the other of the same consecutive stopping locations.

More particularly, the first additional transport assembly 31a withdraws the tray 4 from the second stopping location B and, after appropriately moving it inside the painting station 12, engages it again with the primary transport assembly 19 at the third stopping location C. The second additional transport assembly 31b in turn withdraws the tray 4 from the ninth stopping location I and, after having suitably moved it inside the polymerization station 14, it again engages it with the primary transport assembly 19 at the tenth stopping location J.

The carriage 32 carries a control actuator 36 removably engageable with the drag pin 25 of the tray 4 arrived at the respective stopping location, in the illustrated example the second stopping location B or the ninth stopping location I. To this end it is preferably provided that the control actuator 36 has a gripping fork 37 defining a housing undercut 37a, configured to receive a perimetral shoulder 25c of the drag pin 25 carried by the tray 4. More particularly, when the tray 4 arrives at the respective stopping location B, I, the perimetral shoulder 25c of the drag pin 25 slidably inserts into the housing undercut 37a along a sliding direction parallel to the movement path P.

Upon such engagement, the control actuator 36 is activated to translate the drag pin 25 from the first working position to the second working position, releasing the first end thereof from the respective translator 20 so as to disengage the tray 4 from the primary transport assembly 19.

In reaching the second working position, the drag pin 25 lends itself to engaging the carriage 32, inserting itself axially with a second end 25b thereof in a grafting seat 38 specifically arranged to this end on the carriage 32 itself. The tray 4 is consequently engaged with the carriage 32 so as to be subjected to the movement of the carriage 32 itself along the linear guide 33.

In other words, the tray 4 engaged in each of the first work stations 12, 14 equipped with one of the additional transport assemblies 31a. 31b lends itself to being moved within the respective work station according to desired displacements imposed through the carriage 32. The execution of the treatment in the painting station 12 coincides with at least an action of delivering atomized paint against the articles 2 during the movement of the tray 4. Similarly, the execution of the treatment in the polymerization station 14 coincides with at least one action of irradiation of the articles by means of UV radiation during the movement of the tray 4.

At the same time, the other trays 4 engaged along the movement path P remain stationary in the respective second work stations 13, 15, for the entire duration of the steps of stopping the step-by-step motion.

Furthermore, an auxiliary actuation assembly 39 is preferably associated with the carriage 32, comprising a respective auxiliary dragging plate 40 coplanar with the dragging plates 28 in the other stopping locations D, E, F, G, H. The auxiliary dragging plate 40 therefore lends itself to magnetically coupling with the drive member 9 carried by the respective tray 4, as soon as the latter reaches one of the stopping locations (in the illustrated example the third stopping location C or the ninth stopping location I) associated with the first work station 12, 14 equipped with the additional transport assembly 31a, 31b. An auxiliary rotation motor 41 carried by the carriage 32 provides for the actuation in rotation of the articles 2 being processed carried by the same tray 4 during the execution of the processing in the respective work station 12, 14.

The independent movement of each of the trays 4 in the painting station 12 and of the polymerization 14 makes it possible to optimize the displacements thereof so as to improve the execution of the processing. In particular, the electronic control unit CPU can be programmed from time to time to modulate the displacement speed of the carriage 32, and therefore of the articles 2 being processed, at the first work stations 12, 14 increasing or decreasing it depending on the needs, without necessarily conditioning the frequency of the steps of translation and stopping of the step-by-step motion caused along other parts of the movement path P. The movement devices M can be configured to translate the trays 4 according to a continuous movement, at constant or variable speed, for the entire duration of the treatment performed in each of the first work stations 12, 14. In a different operating configuration, the electronic unit for controlling the CPU can be configured so that two or more forward and/or backward strokes along the transport guide 11 are imposed on the carriage 32 and the respective tray 4, and/or possible stopping steps during the execution of the treatment cycle of the articles 2 in the respective first work station 12, 14.

For example, it may be provided that the alternate movement of the tray 4 comprises at least a first forward stroke, a backward stroke, and a second forward stroke along the movement path, during the execution of the treatment in the first work station 12, 14. The execution of the treatment in the painting station 14 and/or in the polymerization station 14, coinciding respectively with the activation of the aforesaid dispensing nozzles and/or UV emitters, can take place both at the same time as one or both the forward strokes, and at the same time as the backward stroke completed by the tray 4. By doing so, a greater uniformity of distribution of the paint, of the UV radiation and/or other treatment agent delivered on the surfaces of the articles 2 being processed is promoted, especially when the latter present a complex and/or poorly symmetrical conformation around the respective rotation axes.

The actuation of the auxiliary rotation motor 41 in each of the auxiliary transport unit 31a, 31b can be managed by the programmable electronic control unit CPU which, for example through a respective fourth connection line M4, can thus control and adjust the rotation speed of the articles 2 during treatment in each of the first work stations 12, 14.

The rotation speed of the articles 2 in the painting station and/or in the polymerization station 14 therefore lends itself to being modulated, through the auxiliary rotation motor 41, independently of the rotation speed of the articles themselves in other work stations (in the case shown in the drying station 13). For example, during the execution of the backward strokes of the tray 4 the rotation direction of the articles 2 can be reversed with respect to that implemented during the forward strokes.

The paint delivered in the painting station 12 and/or the irradiated polymerizing radiation in the polymerization station 14 can therefore be distributed in the best way possible on the surfaces of the articles 2, while the latter are actuated in rotation.

At the end of the processing cycle, the carriage 32 is stopped with the respective tray 4 at the stopping location (in the illustrated example the third stopping location C or the tenth stopping location J) consecutively downstream of the stopping location wherein the tray itself had been disengaged from the primary transport assembly 19. The control actuator 36 returns the drag pin 25 in engagement relationship with the respective translator 20. The tray 4 is thus again engaged to the dragging member 21 of the primary transport assembly 19, to resume the step-by-step motion along the movement path.

The invention claimed is:

1. Apparatus for surface treatment of articles, comprising:
   a plurality of trays each carrying one or more piece-holding spindles;
   a plurality of work stations distributed along a movement path extending according to a closed line, wherein said plurality of work stations comprises at least a first work station and at least a second work station configured each for the execution of a respective treatment on articles arranged on the one or more piece-holding spindles;
   a transport guide slidably engaging said trays and extending along the movement path;
   movers for moving the trays along the transport guide, through the work stations;
   wherein said movers comprise a programmable electronic control unit, configured to modulate the translation speed of the individual trays along the transport guide so that each tray, while passing through the first work station during the execution of the treatment, moves at a different speed with respect to a moving speed of the trays in the second work station,
   wherein the movers further comprise:
   a primary transporter configured to removably engage the trays and transfer the trays along the transport guide; and an additional transporter configure for:
taking each tray from the primary transporter,
moving the tray at said first work station and
engaging the tray again to the primary transporter,
without the tray being disengaged from the transport guide.

2. Apparatus according to claim 1, wherein the primary transporter is configured to transfer the tray according to a step-by-step motion through a plurality of stopping locations distributed along the movement path, and wherein the additional transporter is configured to pick up each tray at one of said stopping locations.

3. Apparatus according to claim 2, wherein the additional transporter extends parallel to the movement path between at least two of said stopping locations that are mutually consecutive, to transfer the withdrawn tray from one to the other of said consecutive stopping locations.

4. Apparatus according to claim 1, wherein the additional transporter comprises a carriage slidingly guided parallel to the movement path.

5. Apparatus according to claim 1, wherein each tray carries a hooking selectively activatable to engage the tray with the primary transporter.

6. Apparatus according to claim 5, wherein the hooking comprises a drag pin movable between a first working position in which it engages the primary transporter and a second working position in which it disengages the primary transporter.

7. Apparatus according to claim 6, wherein the additional transporter comprises a carriage slidingly guided parallel to the movement path, the apparatus further comprising a control actuator carried by the carriage and detachably engageable with the drag pin, for translating the drag pin between the first working position and second working position.

8. Apparatus according to claim 7, wherein the control actuator has a housing undercut configured to receive a perimetral shoulder of the drag pin, said perimeter shoulder being slidingly insertable into the housing undercut along a sliding direction parallel to the movement path.

9. Apparatus according to claim 1, wherein each of said trays carries rotational actuation devices of the one or more piece-holding spindles, comprising a transmission driven by a driving pulley coaxially integral with a driver, wherein said driver is removably engageable with at least an actuator operating along the movement path.

10. Apparatus according to claim 1, wherein the movers further comprise an auxiliary actuator operating at the first work station for rotating the one or more piece-holding spindles, wherein the auxiliary actuator comprises an auxiliary rotation motor, wherein said programmable electronic control unit operates on the auxiliary rotation motor, and is configured for adjusting the rotation speed and/or reverse the direction of rotation of the one or more piece-holding spindles.

11. Apparatus according to claim 9, wherein the movers further comprise an auxiliary actuator operating at the first work station for rotating the one or more piece-holding spindles, wherein the auxiliary actuator comprises an auxiliary dragging plate operationally couplable with the driver.

12. Apparatus according to claim 11, wherein the actuator comprises a drive shaft driven in rotation and carrying a dragging plate magnetically couplable with the driver, for dragging in rotation the driving pulley of the tray, wherein the auxiliary dragging plate is coplanar to the dragging plate of each tray present along the movement path.

13. Apparatus for surface treatment of articles, comprising:
a plurality of trays each carrying one or more piece-holding spindles;
a plurality of work stations distributed along a movement path extending according to a closed line, wherein said plurality of work stations comprises at least a first work station and at least a second work station configured each for the execution of a respective treatment on articles arranged on the one or more piece-holding spindles;
a transport guide slidably engaging said trays and extending along the movement path;
movers for moving the trays along the transport guide, through the work stations;
wherein said movers comprise a programmable electronic control unit, configured to modulate the translation speed of the individual trays along the transport guide so that each tray, while passing through the first work station during the execution of the treatment, moves at a different speed with respect to a moving speed of the trays in the second work station,
wherein the movers further comprise:
a primary transporter configured to removably engage the trays and transfer the trays along the transport guide; and
an additional transporter configured for taking each tray from the primary transporter, moving the tray at said first work station, and engaging the tray again to the primary transporter [transport group],
wherein the additional transporter comprises a carriage slidingly guided parallel to the movement path,
the apparatus further comprising a control actuator carried by the carriage and detachably engageable with a drag pin, for translating the drag pin between the first working position and second working position,
wherein the control actuator has a housing undercut configured to receive a perimetral shoulder of the drag pin, said perimeter shoulder being slidingly insertable into the housing undercut along a sliding direction parallel to the movement path.

14. Apparatus for surface treatment of articles, comprising:
a plurality of trays each carrying one or more piece-holding spindles;
a plurality of work stations distributed along a movement path extending according to a closed line, wherein said plurality of work stations comprises at least a first work station and at least a second work station configured each for the execution of a respective treatment on articles arranged on the one or more piece-holding spindles;
a transport guide slidably engaging said trays and extending along the movement path;
movers for moving the trays along the transport guide, through the work stations;
wherein said movers comprise a programmable electronic control unit, configured to modulate the translation speed of the individual trays along the transport guide so that each tray, while passing through the first work station during the execution of the treatment, moves at a different speed with respect to a moving speed of the trays in the second work station,
wherein the movers comprise:
a primary transporter configured to removably engage the trays and transfer the trays along the transport guide;

an additional transport unit configured for taking each tray from the primary transporter, moving the tray at said first work station, and engaging the tray again to the primary transporter [transport group], wherein the primary transporter is configured to transfer the tray according to a step-by-step motion through a plurality of stopping locations distributed along the movement path, wherein said step-by-step motion comprises steps of simultaneous advancement of the trays engaged to the primary transporter, intercalated with steps of simultaneous stop of the same trays, and wherein the additional transporter is configured to pick up each tray at one of said stopping locations.

\* \* \* \* \*